(12) United States Patent
Ray et al.

(10) Patent No.: US 8,387,152 B2
(45) Date of Patent: Feb. 26, 2013

(54) ATTESTED CONTENT PROTECTION

(75) Inventors: Kenneth D. Ray, Seattle, WA (US); Nathan T. Lewis, Monroe, WA (US); Matthew C. Setzer, Woodinville, WA (US); David R. Wooten, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 858 days.

(21) Appl. No.: 12/163,426

(22) Filed: Jun. 27, 2008

(65) Prior Publication Data

US 2009/0327705 A1    Dec. 31, 2009

(51) Int. Cl.
*G06F 7/04* (2006.01)
*G06F 17/30* (2006.01)
*G06F 17/00* (2006.01)
*G06F 15/16* (2006.01)
*G06F 12/14* (2006.01)
*G06F 13/00* (2006.01)
*G06F 21/00* (2006.01)
*H04N 7/16* (2011.01)
*H04L 29/06* (2006.01)
*H04L 9/32* (2006.01)
*H04L 9/08* (2006.01)

(52) U.S. Cl. .......... 726/27; 705/56; 705/54; 726/1; 726/6; 726/7; 726/18; 726/19; 713/156; 713/171; 380/278

(58) Field of Classification Search .......... 726/27; 705/56
See application file for complete search history.

(56) References Cited

U.S. PATENT DOCUMENTS

| | | | |
|---|---|---|---|
| 5,721,781 A * | 2/1998 | Deo et al. ..................... | 705/67 |
| 6,006,332 A | 12/1999 | Rabne et al. | |
| 6,327,652 B1 * | 12/2001 | England et al. .................. | 713/2 |
| 6,766,314 B2 * | 7/2004 | Burnett ......................... | 707/694 |
| 7,143,288 B2 * | 11/2006 | Pham et al. ................... | 713/165 |
| 7,404,086 B2 * | 7/2008 | Sands et al. ................... | 713/186 |
| 7,509,685 B2 * | 3/2009 | Lambert ......................... | 726/27 |
| 7,587,607 B2 * | 9/2009 | Brickell et al. ............... | 713/182 |
| 7,739,402 B2 * | 6/2010 | Roese et al. .................. | 709/242 |
| 7,930,733 B1 * | 4/2011 | Iftode et al. ........................ | 726/5 |
| 2004/0003139 A1 | 1/2004 | Cottrille et al. | |
| 2004/0088536 A1 * | 5/2004 | Lim et al. ...................... | 713/151 |
| 2004/0151315 A1 * | 8/2004 | Kim ............................. | 380/241 |
| 2005/0033987 A1 | 2/2005 | Yan et al. | |
| 2005/0060568 A1 | 3/2005 | Beresnevichiene et al. | |
| 2005/0216745 A1 * | 9/2005 | Speare et al. ................. | 713/182 |
| 2005/0251857 A1 | 11/2005 | Schunter et al. | |
| 2006/0059569 A1 * | 3/2006 | Dasgupta et al. ............... | 726/28 |

(Continued)

OTHER PUBLICATIONS

Ram Krishnan, Ravi Sandhu, Kumar Ranganathan, "PEI Models for Scalable, Usable and High-Assurance Information Sharing", ACM, New York, NY 2007.

(Continued)

*Primary Examiner* — Carolyn B Kosowski
(74) *Attorney, Agent, or Firm* — Workman Nydegger

(57) ABSTRACT

Computer systems and environments implemented herein permit a local machine increased participation in authorizing access to protected content. An operating system attests to a computing environment at a corresponding computer system. If the computing environment is one permitted to access protected content, the operating system is permitted to regulate further (e.g., application) access to protected content in accordance with a procreation policy. As such, authorization decisions are partially distributed, easing the resource burden on a content protection server. Accordingly, this computing environment can facilitate more robust and efficient authorization decisions when access to protected content is requested.

20 Claims, 4 Drawing Sheets

U.S. PATENT DOCUMENTS

| | | |
|---|---|---|
| 2006/0184802 A1 | 8/2006 | Ibrahim et al. |
| 2006/0253894 A1 | 11/2006 | Bookman et al. |
| 2006/0265464 A1 | 11/2006 | Nassiri |
| 2007/0179802 A1* | 8/2007 | Buss et al. ............ 705/1 |
| 2007/0192864 A1 | 8/2007 | Bryant et al. |
| 2008/0028436 A1* | 1/2008 | Hannel et al. ............ 726/1 |
| 2008/0270603 A1* | 10/2008 | Berger et al. ............ 709/224 |
| 2009/0006868 A1* | 1/2009 | Alkove et al. ............ 713/193 |
| 2009/0064292 A1* | 3/2009 | Carter et al. ............ 726/5 |
| 2009/0151006 A1* | 6/2009 | Saeki et al. ............ 726/28 |
| 2009/0271618 A1* | 10/2009 | Camenisch et al. ............ 713/155 |
| 2010/0023743 A1* | 1/2010 | Sastry et al. ............ 713/2 |
| 2010/0031047 A1* | 2/2010 | Coker et al. ............ 713/176 |

OTHER PUBLICATIONS

Seth Schoen, "Trusted Computing: Promise and Risk", 2003.

Patrick Roder, Frederic Stumpf, Ralf Grewe, Claudia Eckert, "Hades—Hardware Assisted Document Security", Darmstadt University of Technology, Darmstadt, Germany, WATC, Tokyo, Nov. 30, 2006.

Clark Thomboroson, Matt Barrett, "Governance of Trusted Computing", University of Auckland, Auckland, NZ, 2006.

* cited by examiner

ATTESTED CONTENT PROTECTION

CROSS-REFERENCE TO RELATED APPLICATIONS

Not Applicable.

BACKGROUND

Background and Relevant Art

Computer systems and related technologies are widely used today. Users utilize computers to perform a variety of tasks, including word processing, scheduling, accounting, sending and receiving communications, and the like. Recently, computer systems have been coupled together along with other electronic devices so that these tasks may be performed across a number of distributed systems. In some instances, this may because the same user wishes to perform a task using a number of machines. For example, an employee may wish to review or edit a document that she created at work from her personal computer at home. In other instances, the tasks are performed across a number of distributed systems because a number of users wish to access the information from their respective computers. For example, a single document may be the result of a collaboration of several authors, each of whom needs to be able to access and modify the document. As a result, systems and methods have been developed in order to make electronic content accessible to a number of computer systems.

One difficulty, however, is that it is often difficult to limit or monitor the content after it has become accessible to a number of computer systems. This may lead to problems where the content contains confidential or privileged information that the author of the content wishes to protect, or in other situations where the content includes proprietary information and the author wishes to limit the widespread distribution of the content.

In order to limit the access or distribution of content, a variety of mechanisms have been developed, including applying password protections to the content, creating a version of the content with limited attributes (such as read-only versions), storing the content behind a series of firewalls, and the like. One problem with these mechanisms, however, is that once a user is able to access the information, there are little or no limitations on what the user can do with the information. For instance, once a user has access to a particular file, the user may print the file and distribute the hard copy or may save an additional copy of the file without the protections.

In order to alleviate some of these concerns, Digital Rights Management ("DRM") systems have emerged wherein a content creator can control their electronic content by limiting both the access to the content and the subsequent usage of that content. Thus, various types of DRM have been developed to protect different types of electronic content, such as, for example, pictures, movies, videos, music, programs, multimedia, games, documents, etc.

One category of DRM is a Enterprise Rights Management ("ERM") system, which may be used to control access to documents, such as, for example, electronic mail messages, Word processing documents, and Web pages, and the like. Rights Management Services ("RMS") is an ERM solution. RMS can be used to encrypt documents, and through server-based policies, prevent the documents from being decrypted except by a specified group of authorized people, who are operating in certain environments, under certain conditions, and for certain periods of time. Document based operations like printing, copying, editing, forwarding, and deleting can be allowed or disallowed for individual documents. RMS administrators can deploy RMS templates that group these rights together into predefined policies that can be applied en masse to content.

RMS-protected content can be created by using RMS-enabled applications. RMS-protected content is encrypted and can contain an embedded Usage Policy, which defines the rights each user or group has with respect to the content. An RMS system works by assigning rights to trusted entities, which are either single users or groups of users. Rights are assigned on a per-entity basis. Generally, to protect content, a content author specifies a publishing license (PL) that is applied to the content and kept with the data itself. The publishing license contains all the relevant access control and use restriction information for protecting the content. The content author then submits the content and publishing license to an RMS-enabled application that applies the access control and use restriction information stored in the publishing license to the content. When a user requests access to the content, the access control and use restriction information in the license is evaluated to determine whether the user has sufficient access rights.

Initially, a user can submit authentication information to an RMS server to prove their identity. Subsequently, the RMS server can check the access control and use restriction information to determine the user's rights in the content. The RMS server can then return a usage license reflecting the user's permitted access in the content. However, one aspect of RMS systems is that security at a user's machines is maintained by an RMS component that does not trust other processes operating on the machine and only minimally trusts the execution environment (including shared dlls, other software on the system, user mode debuggers, etc.) provided by the operating system. Due in part to this lack of trust, the RMS component attempts to protect the RMS process from attacks, such as, process debuggers, kernel mode debuggers, other applications, code injection attacks, rerouting of the Import Access Table, etc, using anti-debugging, obfuscation, and other DRM techniques. Thus, one aspect of the RMS system is an attempt to provide a "safe" place to evaluate policy and a "safe" place to store root secrets, which allows for caching of data enabling off-line access to protected data.

The RMS component is heavily obfuscated, and, at its core, contains a public/private key pair used for communication to the RMS server and for storage of root secrets. More particularly, the PL contains all the relevant Access Control and Use Restriction information protecting the data. The PL is bound with Public Key cryptography to a specific RMS Server and is signed by the client machine's Client License Certificate (CLC) that the corporate RMS Server issued to the client machine. A URL to that RMS server is contained in the clear text of the PL so that an RMS aware application can find the specific RMS Server to request access to the protected information.

In order for the client application to read the data, the RMS component must first obtain a Rights management Account Certificate ("RAC"), which identifies a specific user. The RAC contains both a public and private portion. Before the RMS server issues a RAC to a given application it first validates that that local security environment is valid. This check is typically performed by asking the RMS component to sign with an embedded private key. This code path heavily relies on obfuscation and other "black box" techniques and functions only if the surrounding environment is valid. Breaches to either the function itself or the direct extraction of the embedded private key from the RMS component's RSA Vault would result in a compromised environment that would fool the server into issuing the RAC anyway. The RAC is protected by the local RMS security and by the logon credentials of the user.

Secondly the client application must obtain a Use License ("UL"). A client sends its identification in the form of the RAC to the RMS server, along with the PL for the content it wishes to consume. In response, the RMS server checks the PL to ensure that the specific identity represented by the RAC is authorized to read the content. If authorized, the RMS server then creates a UL that is encrypted to the RAC. The UL can be cached on the local machine to facilitate subsequent off-line access to the data.

Unfortunately, the RMS component's minimal trust of the operating system forces each client application to develop its own method for storing PLs along with protected content. PLs can be of variable length further complicating the client application's ability to store PLs. Typically, a client application uses its own data format to store PLs. For example, a client application can store a PL in a header in the file format, in an additional message or packet header in a transmission of protected data, etc.

By requiring each client application to develop its own method for storing PLs along with protected content, the RMS systems currently used in the art require applications to be modified so that they are capable of being used directly with the RMS system. Thus, RMS systems are essentially limited to protected content created at RMS-aware applications

BRIEF SUMMARY OF THE INVENTION

The present invention extends to methods, systems, and computer program products for protecting content. In some embodiments, a computer system includes an operating system and one or more applications. A protection policy is established to protect content. The protection policy is manageable by a rights management system that includes a separate rights management server. The protection policy includes at least: a list of users that are authorized to access the content and computing environments that are permitted to access the content. The computer system determines that a user is attempting to access the protected content through an application at the computer system.

Prior to allowing the application to access the protected content, the computer system exchanges information with the rights management server about the identity of the user. From the exchanged information, it can be validated that the user is authorized to access the content. Also prior to allowing the application to access the protected content, the operating system attests to a set of information indicating a computing environment that is permitted to access the content. The computer system allows the application to access to protected content in response to the operating system attesting to a computing environment that is permitted to access the content and validating that the user is authorized to access the content.

In other embodiments, a protection policy is established to protect content. The protection policy includes: a list of users that are authorized to access the content, operations that authorized users are permitted to perform with respect to the protected content, and computing environments that are permitted to access the content. It is determined that a user is attempting to access protected content through an application at the computer system. The computer system sends user identity information for the user to a rights management server. The operating system attests to a set of information indicating a computing environment at the computer system to the rights management server.

The computer system receives a user key from the content protection server. The user key is usable by the user to access the protected content. The user key is returned to the computer system from the rights management server in response to the rights management server authenticating the user and determining that the attested computing environment is permitted to access the content. The operating system of the computer system permits the application to use the user key to access the protected content. The application controls the user's access to the protected content in accordance with operations that the user is permitted to perform as indicated in the protection policy.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
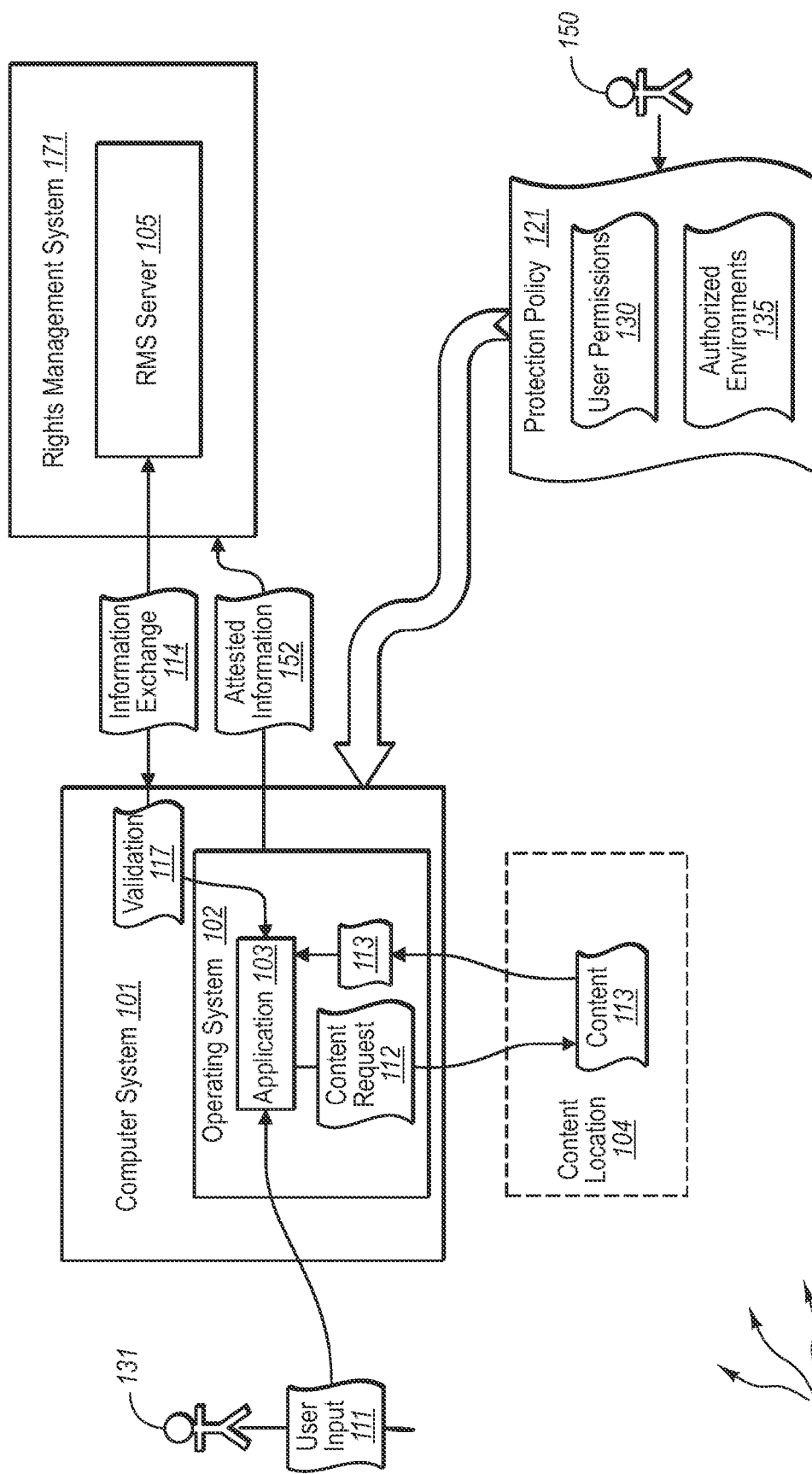
FIG. 1 is a block diagram illustrating a view of an example computer architecture for protecting digital content.

The present invention extends to methods, systems, and computer program products for protecting content. In some embodiments, a computer system includes an operating system and one or more applications. A protection policy is established to protect content. The protection policy is manageable by a rights management system that includes a separate rights management server. The protection policy includes at least: a list of users that are authorized to access the content and computing environments that are permitted to access the content. The computer system determines that a user is attempting to access the protected content through an application at the computer system.

Prior to allowing the application to access the protected content, the computer system exchanges information with the rights management server about the identity of the user. From the exchanged information, it can be validated that the user is authorized to access the content. Also prior to allowing the application to access the protected content, the operating system attests to a set of information indicating a computing environment that is permitted to access the content. The computer system allows the application to access to protected content in response to the operating system attesting to a computing environment that is permitted to access the content and validating that the user is authorized to access the content.

In other embodiments, a protection policy is established to protect content. The protection policy includes: a list of users that are authorized to access the content, operations that authorized users are permitted to perform with respect to the protected content, and computing environments that are permitted to access the content. It is determined that a user is attempting to access protected content through an application at the computer system. The computer system sends user identity information for the user to a rights management server. The operating system attests to a set of information indicating a computing environment at the computer system to the rights management server.

The computer system receives a user key from the content protection server. The user key is usable by the user to access the protected content. The user key is returned to the computer system from the rights management server in response to the rights management server authenticating the user and determining that the attested computing environment is permitted to access the content. The operating system of the computer system permits the application to use the user key to access the protected content. The application controls the user's access to the protected content in accordance with operations that the user is permitted to perform as indicated in the protection policy.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

With this description and following claims, a "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates protecting content. As depicted, computer architecture 100 includes a variety of components and data including computer system 101, rights management system 171, RMS server 105, content location 104, and protection policy 121. Each of the depicted components and data can be connected to one another over a system bus and/or over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, computer system 101 includes one or more applications that can, from time to time, request access to content protected in accordance with a protection policy.

Content can be stored at remote network drives, at Web sites, in databases, in the memory of computer system 101, at message servers, etc. Rights management system (RMS) 171 includes RMS server 105. RMS server 105 can manage protection policies for protected content and provide client computer systems with keys, licenses, etc. for accessing protected content.

As described more fully below, embodiments of the invention allow a business owner or creator of digital content to implement a protection policy such that the content can be protected no matter where the content is subsequently distributed.

Figure 3:
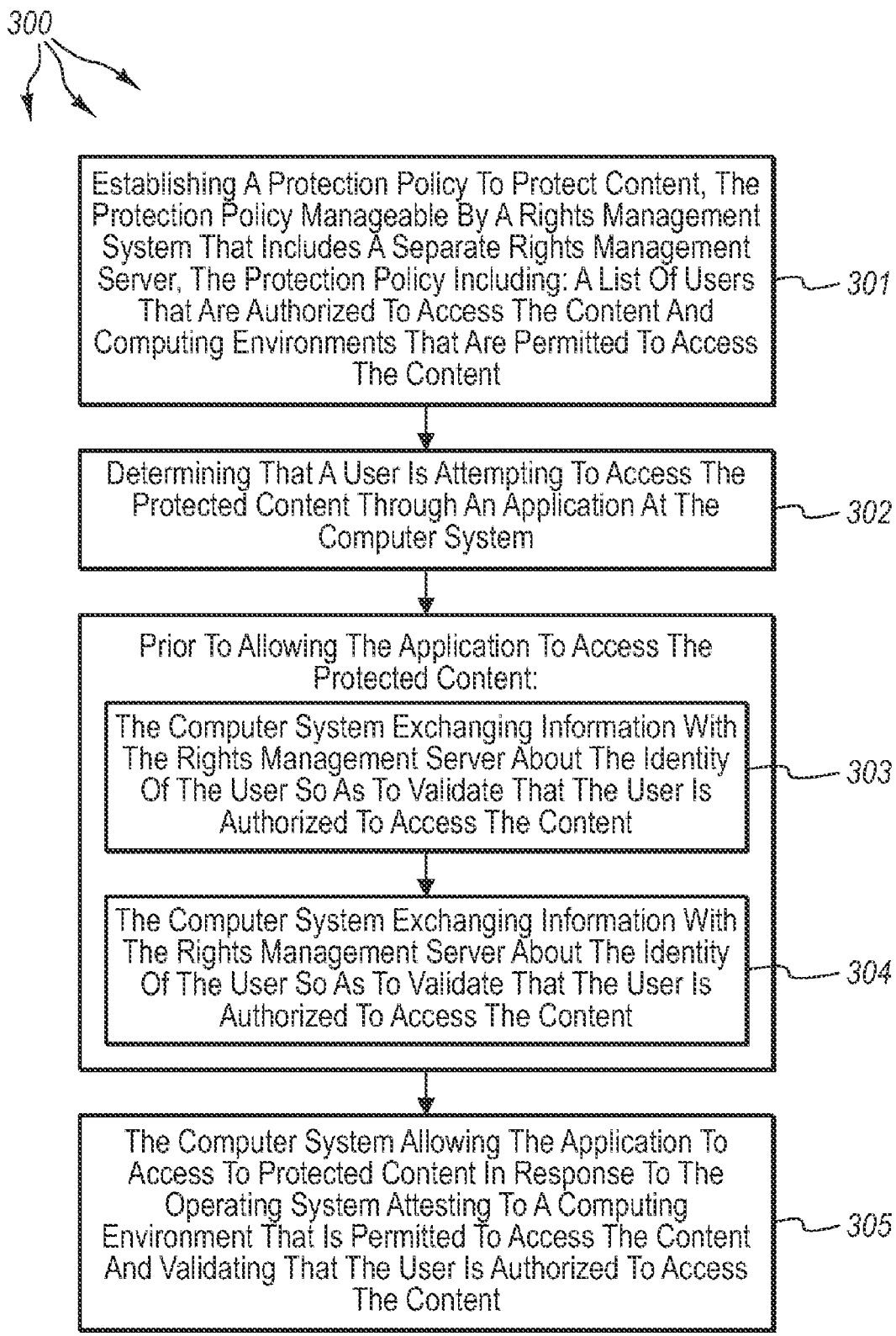
FIG. 3 is a flow chart illustrating an exemplary method for protecting digital content.

FIG. 3 illustrates a flow chart of a method 300 for protecting digital content. Method 300 will be described with respect to the components and data of computer architecture 100 depicted in FIG. 1.

Method 300 includes an act of establishing a protection policy to protect content, the protection policy manageable by a rights management system that includes a separate rights management server, the protection policy including: a list of users that are authorized to access the content and computing environments that are permitted to access the content (act 301). For example, a business owner or creator 150 of content 113 can establish protection policy 121 to protect content 113. Protection policy 121 can include: a list of user permissions 130 and authorized environments 135. User permissions 130 can include a list of users that are authorized to access the content along. Authorized environments 135 can indicate one or more combinations of system attributes of a computer system with a permissible (e.g., at least some level of trust of an) operating environment to regulate access in accordance with protection policy 121.

RMS server 105 and rights management system 171 can manage access to content 113. Thus, once the protection policy 121 is applied to the content 113, access requests to content 113 cause communications with the rights management system 171 in order to gain access to the content 113. Accordingly, protection policy 121 continues to apply to the content 113 regardless of where the content 113 is subsequently distributed.

Method 300 includes an act of determining that a user is attempting to access the protected content through an application at the computer system (act 302). For example, user 131 can enter user input 111 to application 103 to request access to content 113. In response to user input 111, application 103 can send content request 112 to attempt to access content 113 from content location 104. Content location 104 can be virtually any internal (e.g., system memory, etc.), local (connected hard drive, etc.), or remote location (network drive, Web site, etc.) from the perspective of computer system 101. Computer system 101 can detect that content request 112 is an attempt to access content 113 from content location 104.

Prior to allowing the application to access the protected content, method 300 can include an act of the computer system exchanging information with the rights management server about the identity of the user so as to validate that the user is authorized to access the content (act 303). For example, computer system 101 can conduct information exchange 114 with RMS server 105. Information exchange 114 can result in validation 117, indicating that user 131 is validated as an authorized user of content 113.

Also, prior to allowing the application to access the protected content, method 300 includes an act of the operating system attesting to a set of information indicating a computing environment that is permitted to access the content (act 304). For example, operating system 102 can send attested information 152 to RMS server 105. Attested information 152 indicates that the computer environment of computer system 101 is an authorized computing environment. Operating system 102 can attest to a variety of different types of information including, combinations of one or more of the following: a network location (physical or logical), a boot path, a code integrity policy, boot options (e.g., kernel mode debugger enabled, safe mode, etc.), information from a system health agent ("SHA"), information from a system health validator ("SHV"), kernel mode settings of operating system 102, etc.

In response to receiving attested information 152, RMS server 105 can compare the computing environment of computer system 101 to authorized environments 135. RMS server 105 can determine that attested information 152 indicates an environment included in authorized environments 135 (and thus RMS server 105 at least to some extent trusts the computing environment of computer system 101). In some embodiments, the rights management system 171 can validate the kernel mode settings of operating system 102 in order to determine that the user 131 is not attempting to access the content 113 from a computer system 101 having a known security risk. Accordingly, RMS server 105 can permit operating system 102 to regulate further access to content 113 in accordance with user permissions 130. One the other hand, if attested information 152 does not indicate an environment included in authorized environments 135, access to content is denied.

Method 300 includes the computer system allowing the application to access protected content in response to the operating system attesting to a computing environment that is permitted to access the content and validating that the user is authorized to access the content (act 305). For example, operating system 102 can permit application 103 to access content 113. Access to content 113 can be permitted in response operating system 102 attesting to an authorized computing environment and user 131 being authorized (in user permission 130) to access content 113.

Figure 2:
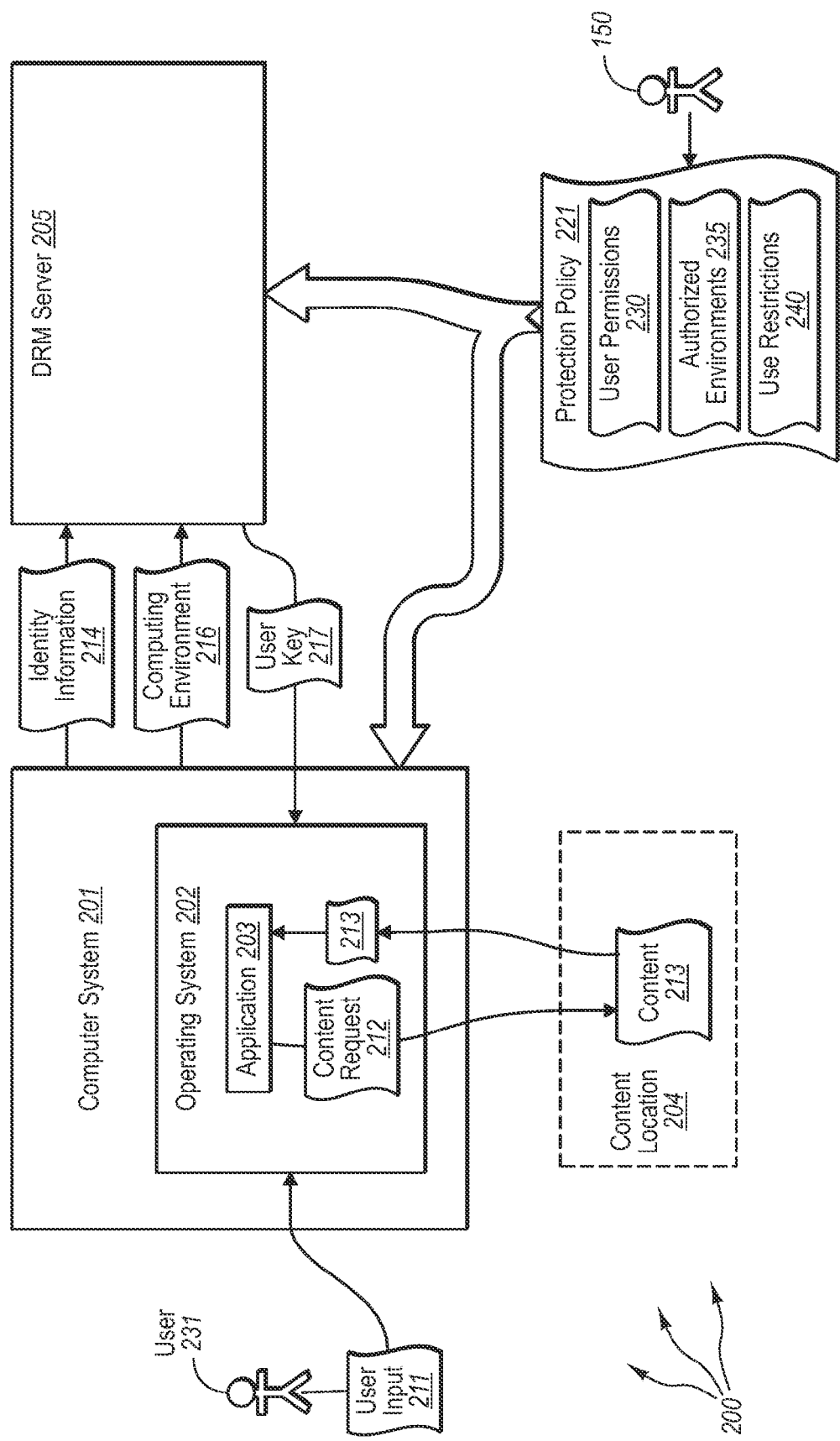
FIG. 2 is a block diagram illustrating a view of another example computer architecture that for protecting digital content.

In some embodiments, use restrictions may also be considered when determining whether the user may perform a particular operation with respect to protected content. FIG. 2 illustrates an example computer architecture 200 that facilitates protecting digital content. As depicted, computer architecture 200 includes a variety of components and data including computer system 201, DRM server 205, content location 204, and protection policy 221. Each of the depicted components and data can be connected to one another over a system bus and/or over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, computer system 202 includes one or more applications 203 that run within operating system 202. The one or more applications 203 can from time to time, request access to content 213 protected in accordance with a protection policy. Content 213 can be stored at remote network drives, at Web sites, in databases, in the memory of computer system 201, at message servers, etc. The DRM server 205 can manage protection policy 221 for protected content 213 and provide client computer systems 201 with keys, licenses, etc. for accessing protected content 213.

Figure 4:
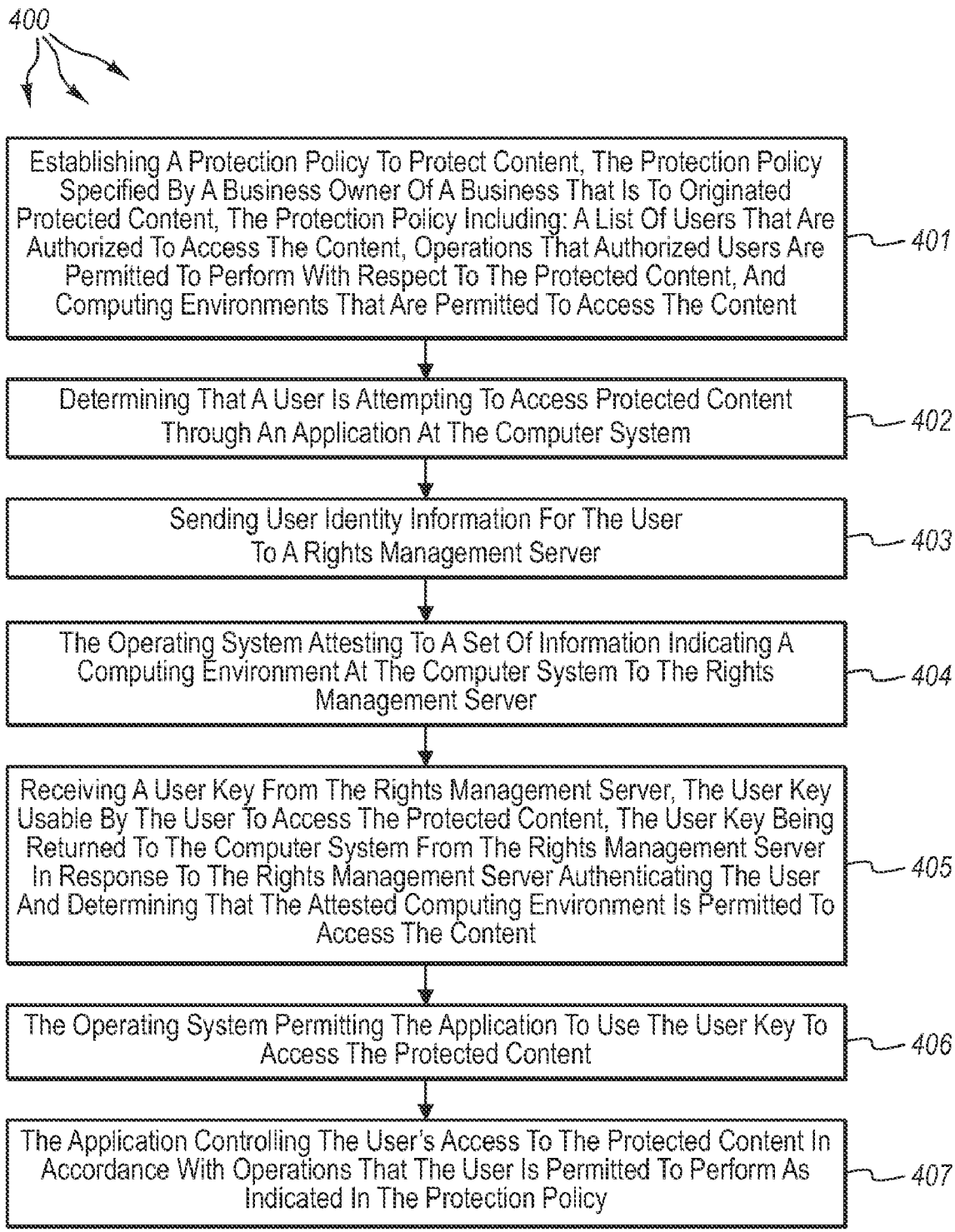
FIG. 4 is a flow chart illustrating of an example method for protecting digital content.

FIG. 4 illustrates a flow chart of an example method 400 for protecting digital content. Method 400 will be described with respect to the components and data of computer architecture 200 depicted in FIG. 2.

Method 400 includes an act of establishing a protection policy to protect content, the protection policy including: a list of users that are authorized to access the content, operations that authorized users are permitted to perform with respect to the protected content, and computing environments that are permitted to access the content (act 401). For example, business owner 150 of content 213 can establish protection policy 221 to protect content 213. Protection policy 221 includes user permissions 230, authorized environments 235, and user restrictions 240. User permissions 230 can include a list of users that are authorized to access the content. Authorized environments 235 can indicate one or more combinations of system attributes that allow a computer system with a permissible (e.g., at least some level of trust of an) operating environment to regulate access in accordance with protection policy 121. Use restrictions 240 can include a list of restrictions that restrict what operations an authorized user is permitted to perform with respect to the protected content.

Method 400 includes an act of determining that a user is attempting to access protected content through an application at the computer system (act 402). For example, user 231 can enter user input 211 to application 203 to request access to content 213. In response to user input 211, application 203 can send content request 212 to attempt to access content 213 from content location 204. Content location 204 can be virtually any internal (e.g., system memory, etc.), local (connected hard drive, etc.), or remote location (network drive, Web site, etc.) from the perspective of computer system 201. Computer system 201 can detect that content request 212 is an attempt to access content 213 from content location 204.

Method 400 includes an act of sending user identity information for the user to a rights management server (act 403). For example, computer system 201 can send identity information 214 to DRM serer 205. Identify information 214 can represent the identity of user 211. RMS server 205 can use identity information 214 to determine if user 231 is an authorized user of protected content 213. For example, RMS server 205 can use identity information 214 to locate permissions for user 231 in user permissions 230.

Method 400 includes an act of the operating system attesting to a set of information indicating a computing environment at the computer system to the rights management server (act 404). For example, operating system 202 can attest to a set of information indicating computing environment 216 and send the attested set of information to DRM server 205.

An attested set of information representing computing environment 216 can include a combination of system attributes of computer system 201. Operating system 202 can use attestation, or some other secure mechanism, to indicate computing environment 216 to RMS server 205 in a manner that RMS server 205 trusts. System attributes indicating computing environment 216 can include one or more of: network location (physical or logical) for computer system 201, a boot path of operating system 202, a code integrity policy of operating system 202, boot options of operating system 202 (e.g., kernel mode debugger enabled, safe mode, etc.), information from a system health agent ("SHA") running at computer system 201, information from a system health validator ("SHV") running at computer system 201, etc.

RMS server 205 can use computing environment 216 to determine if computer system 201 has an appropriate (e.g., partially trustable) computing environment for accessing the content 213. An appropriate environment can indicate that RMS server 205 is willing to trust the computing environment to keep the content 113 adequately protected. For example, RMS server 205 can analyze system attributes in computing environment 216 to determine if some combination of system attributes included in computing environment 216 are indicative of an computing environment included in authorized environments 235 (and thus can be trusted to regulate further content in accordance with protection policy 221)

Different individual system attributes or combinations of system attributes can indicate an authorized computing environment. For example, a network address indicative of a computer system on a local network might be sufficient evidence of an appropriate environment for maintaining a secure environment. On the other hand, for a computer system outside of a firewall a well known boot path, a sufficient code integrity policy, and specified health information may be required evidence to indicate an appropriate environment for maintaining a secured environment.

Thus, when user 231 is an authenticated user of protected content 213 and computing environment 216 is an authorized computing environment, RMS server 205 can return user key 217 to computer system 201.

Method 400 includes an act of receiving a user key from the content protection server, the user key usable by the user to access the protected content, the user key being returned to the computer system from the rights management server in response to the rights management server authenticating the user and determining that the attested computing environment is permitted to access the content (act 405). For example, computer system 201 can receive user key 217 in response to DRM server 105 authenticating user 131 and determining that computing environment 216 is an authorized environment for regulating application access to content 213.

Method 400 includes an act of the operating system of the computer system permitting the application to use the user key to access the protected content (act 406). For example, operating system 202 can permit application 203 to use user key 217 to access content 213. Method 400 includes an act of the application controlling the user's access to the protected content in accordance with operations that the user is permitted to perform as indicated in the protection policy. For example, application 203 can permit access to content 213 in accordance with permissions for user 231 in user permissions 230 and/or restrictions for user 231 in use restrictions 240.

In another embodiment of the invention, the protection policy may further indicate a set of applications that are permitted to access protected content. This set of applications may comprise a list of application IDs of applications that are authorized to access the protected content. These application IDs can be generated from one or more of the application, application version, application patch, history, application ownership, application certification, or the like. Thus, prior to permitting the application to access the protected content when the user and computer system has been validated, the computer system may determine that the application is in the application set of the protection policy. A rights management server can compare the application ID of a requesting application to applications IDs in an application set or can use other mechanisms to determine if an application is in the application set. Thus, in embodiments of the invention where the protection policy includes a set of applications that are permitted to access the protected content, the computer system can limit access to protected content to applications in an application set.

Accordingly, embodiments of the invention permit a local machine increased participation in protecting content. For example, an operating system within an appropriate computing environment is permitted to determine if a user and a particular computer system are authorized to access protected content. Thus, the application is relieved from having to store a publishing license and applications which are not RMS-aware may implement a level of protection on content. Further, authorization decisions are partially distributed, easing the resource burden on a RMS server. Accordingly, embodiments of the invention can facilitate more robust and efficient authorization decisions when access to protected content is requested.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including a processor, an operating system and one or more applications, a method for protecting content, the method comprising:

establishing a protection policy to protect content regardless of where the content is initially or subsequently distributed, the protection policy being manageable by a rights management system that includes a separate rights management server, the protection policy including: a list of users that are authorized to access the protected content and a list of authorized computing environments that are permitted to access the protected content, wherein the list of authorized computing environments is separately specified for and is specific to each portion of protected content, and wherein each authorized computing environment comprises a specific combination of computer system attributes required for the computing environment to be authorized to access the protected content;

determining by the processor that a user is attempting to access the protected content through an application of the one or more applications at the computer system;

prior to allowing the application to access the protected content:

the computer system exchanging information with the rights management server about the user's identity so as to validate that the user is authorized to access the protected content;

the operating system attesting to a specified set of information indicating that the computer system includes the specified combination of computer system attributes required for the computer system to be an authorized computing environment that is permitted to access the protected content according to the established protection policy which includes the list of users and authorized computing environments that are permitted to access the protected content; and the computer system allowing the application to access the protected content in response to the operating system attesting to an authorized computing environment that is permitted to access the protected content and validating that the user is authorized to access the protected content.

2. The method as recited in claim 1, wherein the computer system exchanging information with the rights management server further comprises:

sending user authentication information for the user to the rights management server; and obtaining a user key corresponding to the user authentication information for accessing the protected content;

wherein the act of the computer system allowing the application to access the protected content further comprises allowing the application to use the user key to access the protected content.

3. The method as recited in claim 1, wherein the operating system attesting to a set of information indicating an authorized computing environment that is permitted to access the protected content comprises an act of the computer system using a system health agent to collect data about a state of the computer system.

4. The method as recited in claim 3, wherein the operating system attesting to a set of information indicating an authorized computing environment that is permitted to access the protected content comprises an act of the rights management server using a system health validator to validate the collected data.

5. The method as recited in claim 1, wherein the operating system attesting to a set of information indicating an authorized computing environment that is permitted to access the protected content comprises an act of the operating system attesting to one or more of: a listing of software loaded in a boot path of the computer system, a network location of the computer system, a code integrity policy of the operating system of the computer system, boot options of the operating system, a kernel mode of the computer system, or some combination of the above.

6. The method as recited in claim 1, wherein determining that a user is attempting to access the protected content through an application comprises an act of detecting that a user is attempting to access protected content protected in accordance with the established protection policy.

7. The method as recited in claim 1, wherein establishing a protection policy comprises an act of establishing a protection policy that includes: a set of use restrictions that restrict what operations an authorized user is permitted to perform with respect to the protected content; and further comprising the act of the computer system regulating the user's access to the protected content such that the user is permitted to perform operations that are permitted by the set of use restrictions and prevented from performing operations that are not permitted by the set of use restrictions.

8. The method as recited in claim 1, wherein the protection policy is specified by a business owner of a business that originated the protected content.

9. At a computer system including a processor, an operating system and one or more applications, a method for protecting content, the method comprising:

establishing a protection policy to protect content regardless of where the content is initially or subsequently distributed, the protection policy including: a list of users that are authorized to access the protected content, operations that authorized users are permitted to perform with respect to the protected content, and a list of authorized computing environments that are permitted to access the protected content, wherein the list of authorized computing environments is separately specified for and is specific to each portion of protected content, and wherein each authorized computing environment comprises a specific combination of computer system attributes required for the computing environment to be authorized to access the protected content;

determining by the processor that a user is attempting to access the protected content through an application of the one or more applications at the computer system;

sending user identity information for the user to a rights management server;

the operating system attesting to a specified set of information indicating that the computer system includes the specified combination of computer system attributes required for the computer system to be an authorized computing environment that is permitted to access the protected content according to the established protection policy which includes the list of users and authorized computing environments that are permitted to access the protected content;

receiving a user key from the rights management server, the user key usable by the user to access the protected content, the user key being returned to the computer system from the rights management server in response to the rights management server authenticating the user and determining that the attested authorized computing environment is permitted to access the protected content;

the operating system of the computer system permitting the application to use the user key to access the protected content; and the application controlling the user's access to the protected content in accordance with the operations that the users are permitted to perform as indicated in the protection policy.

10. The method as recited in claim 9, wherein attesting to a set of information indicating an authorized computing environment at the computer system comprises an act of using a system health agent to collect state data about a state of the authorized computing environment of the computing system.

11. The method as recited in claim 10, wherein receiving a user key from the rights management server comprises an act of receiving a user key in response to the content protection server using a system health validator to validate the collected state data.

12. The method as recited in claim 9, wherein the operating system attesting to a set of information indicating an authorized computing environment comprises an act of attesting to one or more of: a listing of software loaded during a boot process, a network location of the computer system, a code integrity policy of the operating system, boot options of the operating system, and kernel mode settings of the computer system.

13. The method as recited in claim 10, wherein establishing a protection policy to protect content comprises an act of a business owner of the protected content establishing the protection policy.

14. A computer system, the computer system comprising:
one or more processors;
system memory; and
one or more physical storage media having stored thereon computer-executable instructions that, when executed by one of the processors, cause the computer system to regulate access to protected content, including the following:

establish a protection policy for protecting content regardless of where the content is initially or subsequently distributed, the protection policy being manageable by a rights management system that includes a separate rights management server, the protection policy including a list of users that are authorized to access the protected content and a list of authorized computing environments that are permitted to access the protected content, wherein the list of authorized computing environments is separately specified for and is specific to each portion of protected content, and wherein each authorized computing environment comprises a specific combination of computer system attributes required for the computing environment to be authorized to access the protected content;

determine that a user is attempting to access the protected content through an application at the computer system;

send user identity information to the rights management server;

attest to a specified set of information indicating that the computer system includes the specified combination of computer system attributes required for the computer system to be an authorized computing environment to the rights management server according to the established protection policy which includes the list of users and authorized computing environments that are permitted to access the protected content;

receive a user key from the rights management server, reception of the user key indicative of:
the rights management server having authenticated the user; and
the rights management server determining that the attested information portrayed an authorized computing environment that is permitted to access the protected content such that the operating system is trusted to regulate the user's access to the protected content in accordance with the protection policy.

15. The system as recited in claim 14, wherein computer-executable instructions that, when executed, cause the computer system to attest to information about the authorized computing environment of the computer system comprise computer-executable instructions that, when executed, cause the computer system to
use a system health agent to collect state data about a state of the computer system; and
attest to the collected state data to the rights management server.

16. The system as recited in claim 15, wherein the rights management server uses a system health validator to validate data collected by the system health agent of the computer system.

17. The system as recited in claim 14, wherein computer-executable instructions that, when executed, cause the computer system to attest to information about the authorized computing environment of the computer system comprise computer-executable instructions that, when executed, cause the computer system to attest to one or more of the following: a listing of software loaded during a boot process, a network location of the computer system, a code integrity policy of the operating system, boot options of the operating system, and kernel mode settings of the computer system.

18. The system as recited in claim 14, wherein computer-executable instructions that, when executed, cause the computer system to establish a protection policy for protecting content comprise computer-executable instructions that, when executed, cause the computer system to establish a protection policy, including a set of use restrictions that restrict what operations an authorized user is permitted to perform with respect to the protected content.

19. The system as recited in claim 18, further computer-executable instructions that, when executed, cause:
the operating system to permit the application to use the user key to access the protected content; and the application to control the user's access to the protected content in accordance with the operations that the user is permitted to perform as indicated in the protection policy.

20. The system as recited in claim 14, wherein computer-executable instructions that, when executed, cause the computer system to establish a protection policy for protecting content comprise computer-executable instructions that, when executed, cause the computer system to establish a protection policy at the direction of a business owner of the protected content.

\* \* \* \* \*